United States Patent Office 3,496,080
Patented Feb. 17, 1970

3,496,080
PHOTOCHEMICAL METHOD FOR PREPARING A SALT OR ESTER OF (CIS-1,2-EPOXYPROPYL) PHOSPHONIC ACID
Elbert E. Harris, Westfield, N.J., assignor to Merck & Co., Rahway, N.J., a corporation of New Jersey
No Drawing. Filed May 15, 1968, Ser. No. 729,455
Int. Cl. B01j 1/10
U.S. Cl. 204—158    9 Claims

ABSTRACT OF THE DISCLOSURE ($\pm$), (—), (cis-1,2-epoxypropyl) phosphonic acid or a salt or an ester thereof is prepared by photochemical means from either dextrorotary, levorotary, or a racemic mixture of the corresponding trans isomer. ($\pm$) and (—) (cis-1,2-epoxypropyl) phosphonic acid and its salts are useful as antimicrobial agents. The (+) isomer is useful as an intermediate in preparing the ($\pm$) form, and in turn, the (—) form.

BACKGROUND OF THE INVENTION ($\pm$) and (—) (cis-1,2-epoxypropyl) phosphonic acid and its salts are useful antimicrobial agents which are active in inhibiting the growth of both gram-positive and gram-negative pathogenic bacteria. The trans isomer also exhibits this valuable activity, although to a lesser extent. Thus, inasmuch as the cis isomer is the more active form, a method for preparing (cis-1,2-epoxypropyl) phosphonic acid from the trans isomer is quite desirable.

DESCRIPTION OF THE PREFERRED EMBODIMENTS

This invention relates to a novel method for preparing (cis-1,2-epoxypropyl) phosphonic acid or a salt or an ester thereof. More particularly this invention relates to a method for preparing (cis-1,2-epoxypropyl) phosphonic acid or salts or esters thereof from the corresponding trans isomer by photochemical means.

In accordance with the preferred embodiment of this invention it has been found that the trans isomer of 1,2-epoxypropyl phosphonic acid and its salts or esters may be converted to the corresponding cis isomer by irradiation with ultraviolet light. This may be schematically represented as follows:

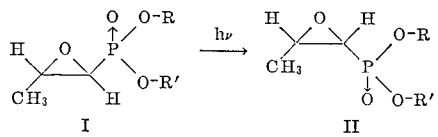

wherein R and R' represent hydrogen or a hydrocarbyl radical and salts thereof where at least one of R and R' is hydrogen. Thus, the compounds designated as Formulas I and II represent the salts, or esters of trans and (cis-1,2-epoxypropyl) phosphonic acid, respectively.

By the term "salts of trans or (cis-1,2-epoxypropyl) phosphonic acid" it is meant any mono or disalt. Typical examples of these salts thus include the mono or di- alkali metal salts (i.e. sodium or potassium), the alkaline earth salts (such as calcium, lithium or magnesium), or the organic amine salts, exemplified by loweralkylamine (methylamine and ethylamine), arylamine (phenyl- amine), aralkylamine (benzylamine and phenethylamine), and also ammonium salts.

By the term "esters of trans or cis-1,2-epoxypropyl) phosphonic acid" is meant the esters obtained when one or both of the hydrogens of the phosphonyl group are replaced by a hydrocarbyl radical such as loweralkyl, loweralkenyl, loweralkynyl, aryl or aralkyl groups. Thus, the esters may be loweralkyl esters wherein the alkyl group is substituted or unsubstituted branched or straight chain containing 1–7 carbon atoms such as methyl, ethyl, propyl, isopropyl, butyl (secondary and tertiary), pentyl, and the like; or loweralkenyl or loweralkynyl esters where- in the unsaturated radical contains 2–7 carbon atoms (straight or branched chain) exemplified by vinyl, meth- allyl, propenyl, propynyl, butenyl, butynyl and the like; or the ester may be an aryl ester (the aryl group exem- plified by phenyl or substituted phenyl (such as halo- phenyl, nitrophenyl or alkylphenyl), an aralkyl ester such as benzyl ester; or an alkaryl ester.

In order to simplify and more clearly describe the in- vention, the following discussion will be in terms of the sodium salt of trans-1,2-epoxypropyl phosphonic acid, al- though it is equally applicable to other salts and esters thereof.

In the photochemical isomerization to the cis product, the sodium salt of trans-1,2-epoxypropyl phosphonic acid starting material may be racemic, either optical isomer, or a mixture of the (+) and (—) enantiomers.

Accordingly, conversion is readily effected by subject- ing a solution of the trans salt to a source of short wave ultraviolet light such as that produced by a mercury vapor lamp for a period of time sufficient for isomerization to occur; [the latter can be determined by periodic vapor phase chormatographic analysis of a lyophilized sample of the reaction mixture (the sample being first converted to an ester by treatment at room temperature for 5 minutes with bistrimethylsilylacetamide in the case of amine salts, and with pyridine and trimethylchlorosilane in the case of other salts)]. Alternatively, the isomerization may be suitably effected by subjecting a solution of the trans isomer which has been sensitized to ultraviolet light by the addition of about 10% (based on the weight of the starting material) of a suitable photo sensitizing agent such as benzophenone or acetophenone. In irradiating the reaction mixture, the solution of trans salt should be con- tained in a vessel which preferably transmits ultraviolet light, such as a quartz vessel. Other type vessels such as ordinary beakers or kettles, however, could be used, pro- viding that the surface area of the solution is sufficiently exposed so that irradiation may contact the solution. The solvent employed is not critical, as long as it does not react with the starting material and transmits rather than absorbs ultraviolet light. Thus, suitable solvents include water, a loweralkanol such as ethyl, methyl or butyl alcohol, dioxane, acetonitrile, or tributylamine, or aque- ous mixtures thereof. Similarly, the temperature range is variable, the irradiation usually being conducted at a temperature of about —10° C. to 100° C. Upon com- pletion of the isomerization, the cis salt may be isolated by concentrating the reaction mixture in vacuo and any unreacted trans isomer separated by repeated recrystalliza- tion using an alcohol:water mixture, or in the case of esters, isolation is effected by preparative vapor phase chromatography.

In addition to the foregoing procedure, a mono or di- ester of ($\pm$) (trans-1,2-epoxypropyl) phosphonic acid or an enantiomeric mixture of (+) and (—) may be con- verted to the ($\pm$) or enantiometric mixture cis salt by irradiating in a basic medium. Thus, by adding a base such as a tertiary organic amine or an amine salt such as pyridine or trimethyl ammonium carbonate to one of the solvent mediums mentioned above, the trans etser is simultaneously converted to the ($\pm$) cis form and hy- drolyzed to an amine salt.

In preparing the salt of (cis-1,2-epoxypropyl) phos- phonic acid as described above where the starting isomer is the racemic form, there is obtained the corresponding cis isomer. When either the (+) or (—) trans isomer is irradiated, the optical activity of the cis product formed may be determined by standard laboratory means, since the (—) (cis-1,2-epoxypropyl) phosphonic acid referred to herein rotates plane-polarized light in a counterclockwise direction (to the left as viewed by the observer) when the rotation of its disodium salt is measured in water (5% concentration) at 405μ.

(±) and (—) (cis-1,2-epoxypropyl) phosphonic acid and its salts are useful antimicrobial agents which are active in inhibiting the growth of both gram-positive and gram-negative pathogenic bacteria. The (—) form, and particularly its salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarium, Salmonella pullorum, Proteus vulgaris, Proteus mirabilis, Proteus morganii, Staphylococcus aureus* and *Staphylococcus pyogenes*. Thus, (±) and (—) (cis-1,2-epoxypropyl) phosphonic acid and salts thereof can be used as antiseptic agents to remove susceptible organisms from pharmaceutical, dental, and medical equipment and other areas subject to infection by such organisms. Similarly, they can be used to separate certain microorganisms from mixtures of microorganisms. Salts of (—) (cis-1,2-epoxypropyl) phosphonic acid are also useful in the treatment of diseases caused by bacterial infections in man and animals and are particularly valuable in this respect, since they are active against resistant strains of pathogens. These salts, such as the sodium, calcium, or potassium salt, are especially valuable, since they are effective when given orally, although they can also be administered parenterally.

In addition, the salts of (±) (cis-1,2-epoxypropyl) phosphonic acids are useful as preservatives in industrial applications, since they effectively inhibit undesirable bacterial growth in the white water used in paper mills and in paints, e.g. in polyvinyl acetate latex paint.

The designation cis used in describing the 1,2-epoxypropyl phosphonic acid compounds means that each of the hydrogen atoms attached to carbon atoms 1 and 2 of the propylphosphonic acid are on the same side of the oxide ring, and the designation trans means that each of the hydrogen atoms attached to carbon atoms 1 and 2 of the propylphosphonic acid are on opposite sides of the oxide ring.

The (—) isomer, particularly in the form of its salts, may be used directly, since these salts exhibit significantly biological activity. The (+) cis isomer so attained so obtained is useful as an intermediate in preparing (±) (cis-1,2-epoxypropyl) phosphonic acid. For example, (+) (cis-1,2-epoxypropyl) phosphonic acid may be treated with a reducing metal such as ferrous sulfate or stannous chloride and thus de-epoxidized to form cis-propenylphosphonic acid. The cis-propenylphosphonic acid may then be epoxidized using sodium tungstate and hydrogen peroxide to form (±) (cis-1,2-epoxypropyl) phosphonic acid.

EXAMPLE 1

A stirred solution containing 1.3 g. of the monobenzylamine salt of racemic (trans-1,2-epoxypropyl) phosphonic acid dissolved in 50 ml. of water in a 100 ml. quartz flask is irradiated with a 200 watt mercury lamp while maintaining the temperature at 0–5° C. by means of an ice bath. After the tenth hour, samples are extracted every hour from the reaction mixture, lypholized, and subjected to VPC analysis to determine the presence of racemic (cis-1,2-epoxypropyl) phosphonic acid as its trimethylsilyl ester. After 18 hours the reaction mixture is concentrated in vacuo on a rotary evaporator to a weight of about 4 g. The concentrated mixture is then dissolved in isopropanol and warmed to effect complete solution, and the alcoholic solution is then chilled in an ice bath for several hours. The resulting precipitate is filtered off and repeatedly recrystallized from an 80:20 isopropanol:water mixture (v./v.) to obtain racemic (cis-1,2-epoxypropyl) phosphonic acid. as the monobenzylamine salt.

When this procedure is repeated using the monosodium or triethylamine salt of racemic (trans-1,2-epoxypropyl) phosphonic acid, there is obtained the corresponding racemic monosodium or triethylamine salt of (cis-1,2-epoxypropyl) phosphonic acid.

EXAMPLE 2

To a 250 ml. round bottom Pyrex flask equipped with a magnetic stirrer and thermometer is added 2.5 g. of the α-phenethylamine salt of (±) (trans-1,2-epoxypropyl) phosphonic acid, 100 ml. of aqueous dioxane and .25 g. of benzophenone. The reaction mixture is then irradiated with a 200 watt mercury lamp while maintaining the temperature at about 10–20° C. by means of an ice bath. After the fifth hour, hourly samples are removed from the reaction mixture, lypholized, and subjected to VPC analysis to determine the presence of racemic (cis-1,2-epoxypropyl) phosphonic acid. After nine hours there is obtained racemic (cis-1,2-epoxypropyl) phosphonic acid as the α-phenethylammonium salt.

When this procedure is repeated using the dicyclohexylamine salt of racemic (trans-1,2-epoxypropyl) phosphonic acid and the solvent is 50% aqueous isopropanol, there is obtained the corresponding dicyclohexylamine salt of racemic (cis-1,2-epoxypropyl) phosphonic acid.

EXAMPLE 3

To a 250 ml. round bottom Pyrex flask equipped with a magnetic stirrer and thermometer is added 2.5 g. of the di-ammonium salt of (trans-1,2-epoxypropyl) phosphonic acid, 100 ml. of 50% aqueous acetonitrile, and .25 g. of acetophenone. The reaction mixture is then irradiated with a 200 watt mercury lamp while maintaining the temperature at about 10–20° C. by means of an ice bath. After the fourth hour, hourly samples are removed from the reaction mixture, lypholized, and subjected to VPC analysis to determine the presence of (cis-1,2-epoxypropyl) phosphonic acid. After nine hours there is obtained (cis-1,2-epoxypropyl) phosphonic acid in the form of its ammonium salt.

When this procedure is repeated using the monolithium or potassium salt of (±) (trans-1,2-epoxypropyl) phosphonic acid there is obtained the corresponding salt of (±) (cis-1,2-epoxypropyl) phosphonic acid.

EXAMPLE 4

Preparation of (±) (cis - 1,2 - epoxypropyl) phosphonic acid by ultraviolet irradiation of the trans dimethyl ester An amount of 2.6 grams of dimethyl (±) (trans-1,2-epoxypropyl) phosphonate is added to 50 ml. of 2% trimethylammonium carbonate solution in a quartz flask. The solution is irradiated with a mercury vapor lamp for 28 hours at 25–30° C. The product is crystallized from alcohol after removal of the water by evaporation. The product is the trimethylammonium salt of (±) (cis-1,2-epoxypropyl) phosphonic acid.

EXAMPLE 5

In a 200 ml. quartz vessel a stirred solution containing 1.5 gm. of the diethyl ester of (trans-1,2-epoxypropyl) phosphonic acid dissolved in 100 ml. of 50% aqueous isopropanol is irradiated with a 200 watt mercury lamp while maintaining the temperature at 0–5° C. by means of an ice bath. After the second hour, samples are extracted hourly and subjected to VPC analysis to determine the presence of diethyl (cis-1,2-epoxypropyl) phosphonate. The reaction mixture is then concentrated in vacuo on a rotary evaporator and the racemic ester is isolated by fractional distillation.

When the above experiment is repeated using the dimethyl ester of (trans-1,2-epoxypropyl) phosphonic acid, there is recovered the dimethyl cis ester (B.P. 70–72° C. at 0.5 mm. pressure).

EXAMPLE 6

To a 250 ml. round bottom Pyrex flask equipped with a magnetic stirrer and thermometer is added 3 gm. of the dipropargly ester of (±) (trans-1,2-epoxypropyl) phosphonic acid, 125 ml. of acetonitrile, and 0.3 g. of acetophenone. The reaction mixture is then irradiated with a 200 watt mercury vapor lamp while maintaining the temperature at about 15–20° C. by means of an ice bath. After 10 hours there is obtained (±) (cis-1,2-epoxypropyl) phosphonic acid in the form of the dipropargyl ester.

When the above experiment is repeated using the mono-allyl (±) trans ester, there is obtained the monoallyl ester of (±) (cis-1,2-epoxypropyl) phosphonic acid.

EXAMPLE 7

In a 200 ml. quartz vessel a stirred solution containing 115 g. of the dibenzyl ester of (±) (trans-1,2-epoxypropyl) phosphonic acid dissolved in 100 ml. of isopropanol is irradiated with a 200 watt mercury lamp while maintaining the temperature at 10–20° C. by means of an ice bath. After five hours, the reaction mixture is concentrated in vacuo on a rotary evaporator. The residue contains the dibenzyl ester of (±) (cis-1,2-epoxypropyl) phosphonic acid.

When the above experiment is repeated using the diphenyl, the monobenzyl, or the mono-(p-chlorophenyl) trans ester, there is obtained the corresponding diphenyl, monobenzyl or mono-(p-chlorophenyl) (±) cis ester of 1,2-epoxypropyl phosphonic acid.

The (trans-1,2-epoxpropyl) phosphonic acid may be prepared as follows.

3.7 g. of diisopropyl(2-chloropropyl) phosphonate is added to a solution containing 1 g. of potassium hydroxide dissolved in 80 ml. of absolute ethanol. The reaction mixture is then refluxed and after three hours cooled and filtered. The filtrate is concentrated to dryness in vacuo and the resulting residue dissolved in ether and washed with cold dilute hydrochloric acid until the washes are acidic. The organic layers are then separated and washed with 3×15 ml. of water, dried over sodium sulfate, and filtered. The solvent is then removed from the filtrate under vacuum and the residue obtained dissolved in 25 ml. of concentrated hydrochloric acid and heated at reflux. After 30 minutes at reflux the solution is filtered and the filtrate is concentrated in vacuo. The residue contains trans propenylphosphonic acid. This residue is then dissolved in water, and the pH of the solution is adjusted to 6 with concentrated ammonium hydroxide. Upon concentration of this mixture in vacuo there is obtained 335.2 mg. of the ammonium salt of trans propenylphosphonic acid.

335.2 mg. of ammonium salt of trans propenylphosphonic acid is dissolved in 10 ml. of water and the pH of the solution is adjusted to 5.5 with amomnium hydroxide. To this solution is added 6.7 mg. of sodium tungstate and the reaction is then heated to 55°, after which there is immediately added 0.3 ml. of hydrogen peroxide. After heating the reaction mixture for 1½ hours at 55°, the mixture is allowed to cool and freeze-dried at room temperature overnight, whereupon there is obtained 340 mg. of the (±) ammonium salt of (trans-1,2-epoxypropyl) phosphoonic acid.

Other salts of trans-1,2-epoxypropyl phosphonic acid may be obtained by passing a solution of the ammonium salt through a column containing a strong ion exchange resin adjusted to the H+ cycle (Dowex 50) into a theoretical calculated amount of an appropriate base (benzylamine, sodium hydroxide, potassium hydroxide, and the like).

Esters of the epoxy acid may be prepared by treating the sodium salt with an equivalent amount of silver nitrate. After aging for 24 hours, the mixture is filtered. The silver salt thus obtained is then suspended in dimethoxyethane and reacted with an appropriate alkyl, alkenyl, alkynyl or aralkyl halide at about 60° C. Other esters (aryl) may be prepared by dissolving propenyl phosphonic acid, thionyl chloride and pyridine in benzene, and reacting the acid chloride thus formed with phenol or a substituted phenol. The aryl propenyl phosphonate thus formed may then be epoxidized using hydrogen peroxide and sodium tungstate.

What is claimed is:
1. A method for preparing a salt or ester of (cis-1,2-epoxypropyl) phosphonic acid which comprises irradiating with ultraviolet light a solution containing the corresponding salt or ester of) trans-1,2-epoxypropyl) phosphonic acid.

2. The method of claim 1 wherein the (trans-1,2-epoxypropyl) phosphonic acid salt or ester is irradiated in the presence of a photosensitizing agent.

3. The method of claim 2 wherein the solution to be irradiated contains an ester of (trans-1,2-epoxypropyl) phosphonic acid.

4. The method of claim 3 wherein the irradiation is effected in the presence of a base.

5. The method of claim 3 wherein hte ester is a lower-alkyl ester of (trans-1,2-epoxypropyl) phosphonic acid.

6. The method of claim 5 wherein the ester is the methyl ester of (trans-1,2-epoxypropyl) phosphonic acid.

7. The method of claim 1 wherein the solution to be irradiated contains a metal salt of (trans-1,2-epoxypropyl) phosphonic acid or salts or esters thereof.

8. The method of claim 7 wherein the metal salt is the disodium salt.

9. The method of claim 1 wherein the solution to be irradiated contains an amine salt of (trans-1,2-epoxypropyl) phosphonic acid.

References Cited

UNITED STATES PATENTS 3,094,471   6/1963   Merritt et al. _____ 204—158

HOWARD S. WILLIAMS, Primary Examiner